US011200815B2

(12) United States Patent
White et al.

(10) Patent No.: US 11,200,815 B2
(45) Date of Patent: Dec. 14, 2021

(54) TACTILE COMMUNICATION TOOL (71) Applicants: Kimberly White, Livonia, MI (US); Laura LaPorte, Trenton, MI (US)

(72) Inventors: Kimberly White, Livonia, MI (US); Laura LaPorte, Trenton, MI (US)

(\*) Notice: Subject to any disclaimer, the term of this patent is extended or adjusted under 35 U.S.C. 154(b) by 595 days.

(21) Appl. No.: 16/194,743

(22) Filed: Nov. 19, 2018

(65) Prior Publication Data
US 2019/0156703 A1 May 23, 2019

Related U.S. Application Data (60) Provisional application No. 62/588,281, filed on Nov. 17, 2017.

(51) Int. Cl.
G06F 3/048 (2013.01)
G09B 21/00 (2006.01)
G06F 3/0488 (2013.01)
G06F 3/023 (2006.01)
G06F 3/02 (2006.01)

(52) U.S. Cl.
CPC ......... *G09B 21/007* (2013.01); *G06F 3/0238* (2013.01); *G06F 3/04886* (2013.01); *G09B 21/004* (2013.01); *G09B 21/006* (2013.01); *G09B 21/008* (2013.01); *G06F 3/0224* (2013.01)

(58) Field of Classification Search
CPC .. G09B 21/007; G06F 3/0238; G06F 3/04886
See application file for complete search history.

(56) References Cited

U.S. PATENT DOCUMENTS

| 8,932,061 | B2* | 1/2015 | Abernethy, Jr. ..... | G09B 21/003 |
| | | | | 434/113 |
| 9,104,271 | B1* | 8/2015 | Adams .................... | G06F 3/014 |
| 9,105,196 | B2* | 8/2015 | Dobbs .................... | G09B 19/24 |
| 9,189,156 | B2* | 11/2015 | Gutowitz ............ | G06F 3/03547 |
| 9,261,961 | B2* | 2/2016 | Smith ................... | G09B 21/007 |
| 9,286,884 | B2* | 3/2016 | Baker ................... | G09B 21/007 |
| 9,665,178 | B2* | 5/2017 | Bukurak ................. | G06F 3/017 |
| 9,760,172 | B2* | 9/2017 | Ray ........................ | F15B 15/10 |
| 9,828,158 | B2* | 11/2017 | Moore ................. | B65D 5/4212 |
| 10,429,930 | B2* | 10/2019 | Day ....................... | G07F 19/201 |
| 11,003,249 | B2* | 5/2021 | Aono ..................... | G06F 3/0202 |
| 2014/0123050 | A1* | 5/2014 | Danielsson ........... | G06F 3/0488 |
| | | | | 715/773 |

(Continued)

*Primary Examiner* — David E Choi
(74) *Attorney, Agent, or Firm* — Brooks Kushman P.C.

(57) ABSTRACT

A tactile communication tool for transforming a user input command into an audio output signal is provided. The tool presents a user with a housing, a plurality of buttons, a sound processing unit with a speaker, and an overlay set with a plurality of tactually discernable non-Braille characters or tactually discernable non-Braille images embossed upon it. The plurality of tactually discernable non-Braille images characters or tactually discernable non-Braille images can be positioned over the plurality of buttons such that when one of the buttons is pressed by a user, the user input command is processed, and an audio output signal is generated. The tool could also be used for providing input to a computer system. The overlay set could also be a plurality of individual tactile overlay keys.

15 Claims, 6 Drawing Sheets

(56) References Cited

U.S. PATENT DOCUMENTS

| | | | |
|---|---|---|---|
| 2015/0140522 A1* | 5/2015 | Bose | G09B 21/007 434/113 |
| 2015/0205368 A1* | 7/2015 | Yairi | G06F 3/0447 345/173 |
| 2015/0310762 A1* | 10/2015 | Seim | G09B 15/00 434/113 |
| 2016/0092095 A1* | 3/2016 | Baek | G06F 3/04847 715/762 |
| 2016/0240102 A1* | 8/2016 | Barr | G09B 21/007 |
| 2016/0379523 A1* | 12/2016 | Dobbs | G09B 21/006 434/113 |
| 2017/0010804 A1* | 1/2017 | Min | G06F 3/0485 |
| 2017/0091877 A1* | 3/2017 | Geis | A01G 23/006 |
| 2017/0116884 A1* | 4/2017 | Choi | G06F 3/04886 |
| 2019/0038057 A1* | 2/2019 | Lepine | A47G 21/02 |
| 2019/0156703 A1* | 5/2019 | White | G06F 3/0238 |

\* cited by examiner

TACTILE COMMUNICATION TOOL

CROSS REFERENCE TO RELATED APPLICATION

This application claims the benefit of U.S. provisional application Ser. No. 62/588,281 filed Nov. 17, 2017, the disclosure of which is incorporated in its entirety by reference herein.

TECHNICAL FIELD

In at least one aspect, the present invention is related to audio learning or communication tools, and in particular, to tactile learning or communication tools.

BACKGROUND

Alternative communication techniques have been developed to aid individuals who may have difficulty communicating verbally as a result of congenital or acquired impairments. One example of an alternative communication technique is the GoTalk product line, featuring a collection of low-tech tablets that present a user with a set of drawings over buttons that can be actuated to produce a word or a phrase. While these products may satisfy the needs of users who can see the drawings presented, they could be improved to assist users who are also visually impaired in communicating. Further, while various devices have been adapted to assist visually impaired users by presenting a Braille interface, not all verbally and/or sight impaired individuals are familiar with Braille.

Accordingly, there remains a need for improved non-Braille tools to aid verbally and/or sight impaired individuals in communication.

SUMMARY

The present invention solves one or more problems of the prior art by providing, in at least one embodiment, a tool for transforming a user input command into an audio output signal. The tool includes a housing, a plurality of buttons, and a voice generator with a speaker. The tool also includes an overlay sheet that can be received in the housing through a slot. The overlay sheet has embossed upon it a plurality of tactually discernable non-Braille characters or tactually discernable non-Braille images that can be discerned by touch. The plurality of tactually discernable non-Braille characters or discernable non-Braille images can be positioned over the plurality of buttons and beneath a plurality of openings defined in the housing. The plurality of openings allow access to the plurality of buttons. Each of the plurality of tactually discernable non-Braille characters or tactually discernable non-Braille images may be indicative of an input command, so that when one of the buttons is pressed by a user, the indicated input command is processed, and an associated audio output signal is generated by the speech module. Further, there may be multiple interchangeable overlay sheets and arrow keys allowing a user to switch between a set of audio output signals corresponding to each. The tool may include a microphone and a memory drive for recording and storing the audio output signals. The tool may also include a memory-clearing function to erase stored audio output signals. The tool may alternatively include electronic audio synthesizing capabilities for producing the audio output signals.

In another embodiment, a user input tool for a computer system is provided. The user input tool includes a housing and a plurality of buttons secured to (i.e., attached to) the housing. Each button is embossed with a tactually discernable non-Braille character or tactually discernable non-Braille image, and each tactually discernable non-Braille character or tactually discernable non-Braille image is indicative of a user input command. The user input apparatus can be operatively engaged (i.e., in communication with) with a computer system by a wireless or wired connection, so that when one of the buttons is pressed by a user, the indicated user input command is communicated to the computer system such that a predetermined operation is performed. The user input apparatus may also include a transceiver allowing communication with the computer system.

In yet another embodiment, a user input tool for a computer system is provided. The user input tool includes a housing, a plurality of buttons, and an overlay set that can be associated with the housing. The overlay set is embossed with a plurality of tactually discernable non-Braille characters or discernable non-Braille images that can be positioned over the plurality of buttons. Each tactually discernable non-Braille character or tactually discernable non-Braille image is indicative of a user input command. The user input apparatus can be operatively engaged (i.e., in communication with) with a computer system by a wireless or wired connection, so that when one of the buttons is pressed by a user, the indicated user input command is communicated to the computer system such that a predetermined operation is performed. The adapter set could be a plurality of individual tactile overlay keys. The overlay set could alternatively be a sheet received into a slot defined in the housing. The user input apparatus could further include multiple interchangeable overlay sets.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Figure 1:
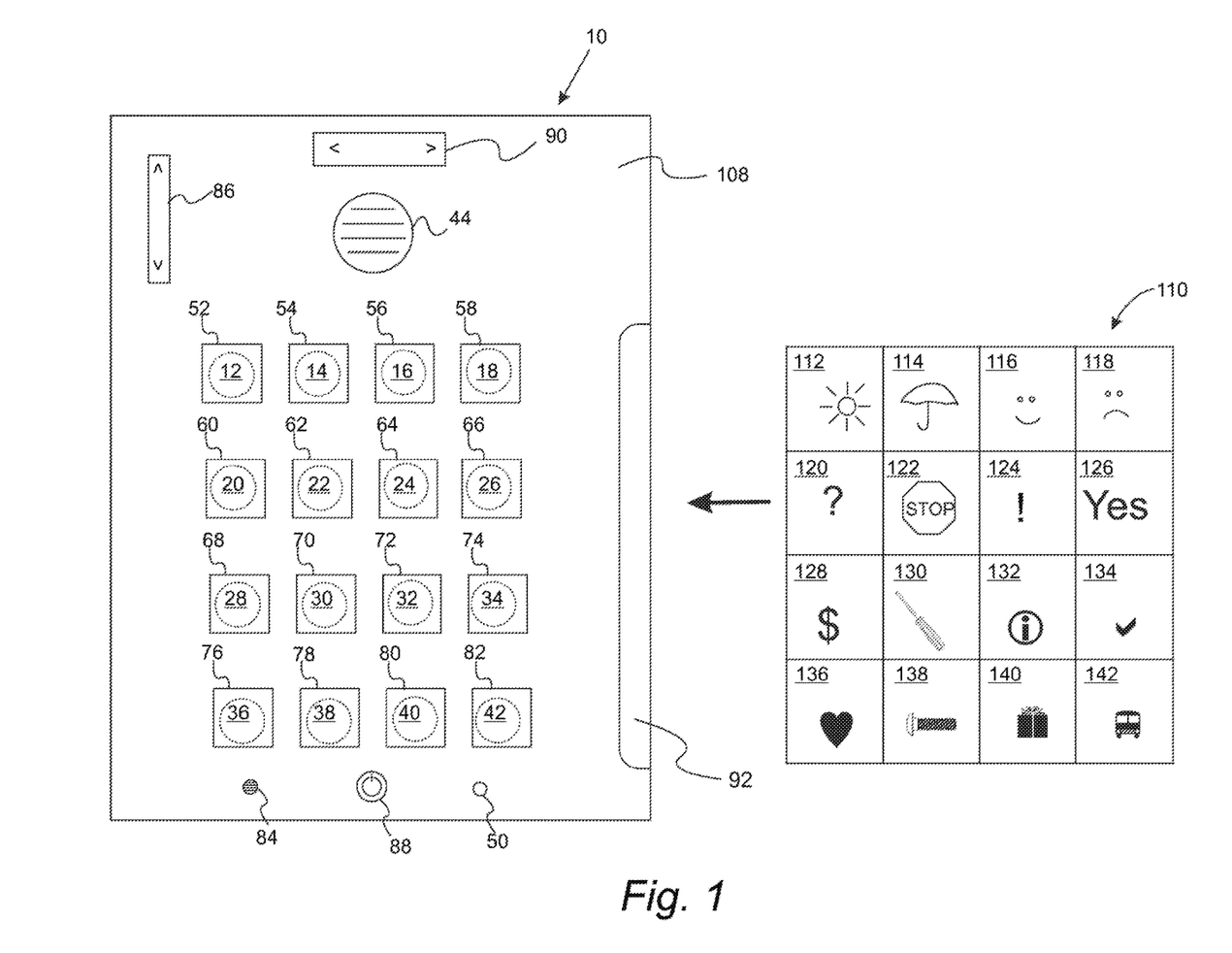
FIG. 1 is a schematic illustration of a tactile communication tool of various embodiments.

With reference to FIG. 1, a tactile communication tool is provided in various embodiments. Tactile communication tool 10 includes a housing 108, a plurality of buttons 12-42, a speaker 44, and an overlay sheet 110. Overlay sheet 110 is configured to be inserted into and removed from the housing 108. The housing 108 defines a plurality of openings 52-82 allowing access to the plurality of buttons 12-42. The overlay sheet 110 is embossed with a plurality of tactually discernable non-Braille characters or images 112-142. "Non-Braille" means that the characters or images are not Braille characters, images or words. Each tactually discernable non-Braille character or tactually discernable non-Braille image 112-142 is representative of an input command that a user may want to communicate. When the overlay sheet 110 is inserted into a slot 92 defined in the housing 108, the plurality of tactually discernable non-Braille characters or tactually discernable non-Braille images 112-142 is positionable over the plurality of buttons 12-42 and beneath the plurality of openings 52-82. The overlay sheet 110 could alternatively be a plurality of interchangeable overlay sheets. Tactile communication tool 10 can include a microphone 84 and a memory capacity for storing audio output signals recorded by a user. Tactile communication tool 10 can include arrow keys 90 enabling a user to switch between a set of audio output signals corresponding to a first overlay sheet and a set of audio output signals corresponding to a second overlay sheet. Tactile communication tool 10 can also include user-actuatable reset button 50 enabling a memory-clearing function to erase audio output signals recorded by a user. Alternatively, tactile communication tool 10 can include electronic audio synthesizing capabilities for generating audio output signals. Tactile communication tool 10 can also include a volume control 86 for controlling output volume and a power button 88 for turning the tool on and off.

Figure 2:
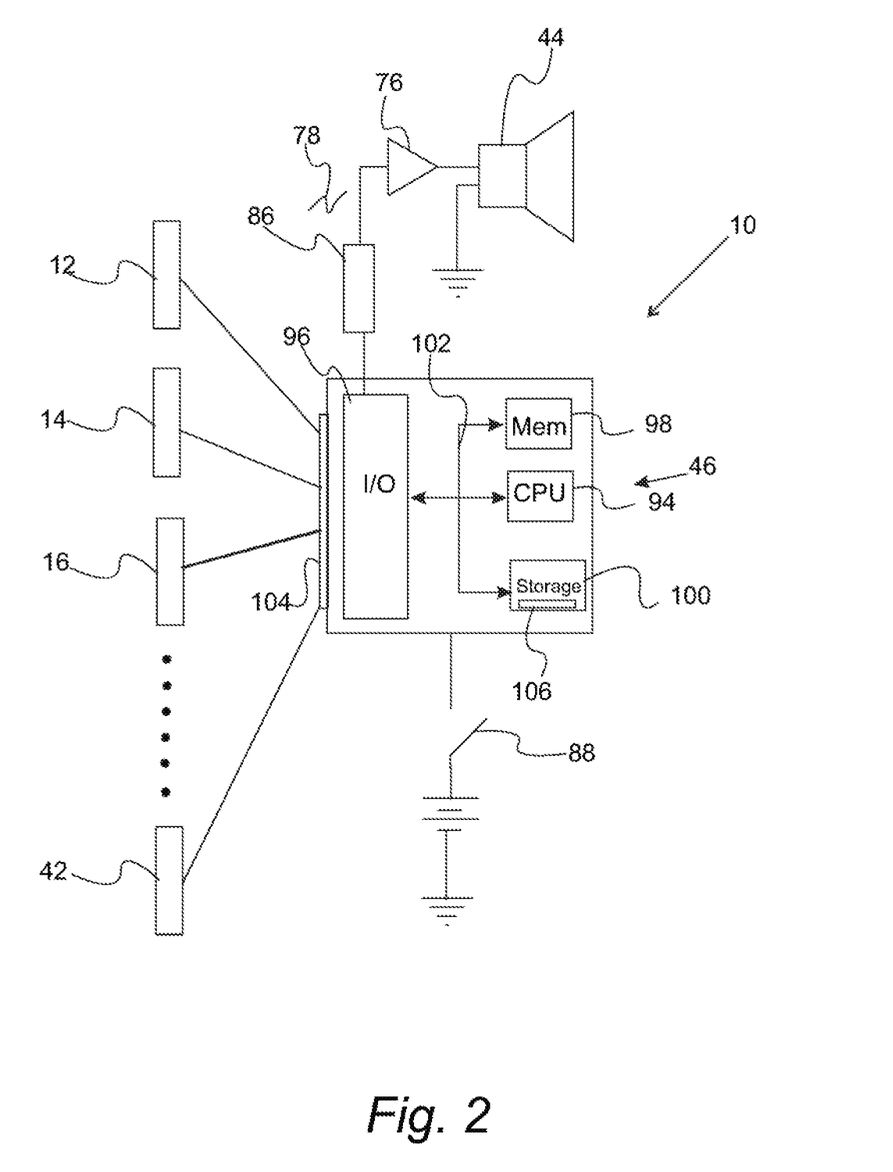
FIG. 2 is a schematic illustration of the active components of a tactile communication tool as shown in FIG. 1.

With reference to FIG. 2, voice generator 46 receives the user selection regarding which button has been actuated. Typically, voice generator 46 is a sound processing unit that includes central processing unit (CPU) 94 that communicates with input/output subsystem 96, random access memory 98, and memory storage device 100 along one or more buses 102. Voice generator 46 includes an input module 104 which is in electrical communication with buttons 12-42. The input from buttons 12-42 is ultimately received by input/output subsystem 96 of voice generator 46. The button selection is interpreted by CPU 94. An appropriate sound file 106 is retrieved from memory storage device 100. The sound file is processed by CPU 94 with an output signal 78 being provided to speaker 44 through input/output subsystem 96. This signal can be applied by amplifier 76 before reaching speaker 44.

Figure 3:
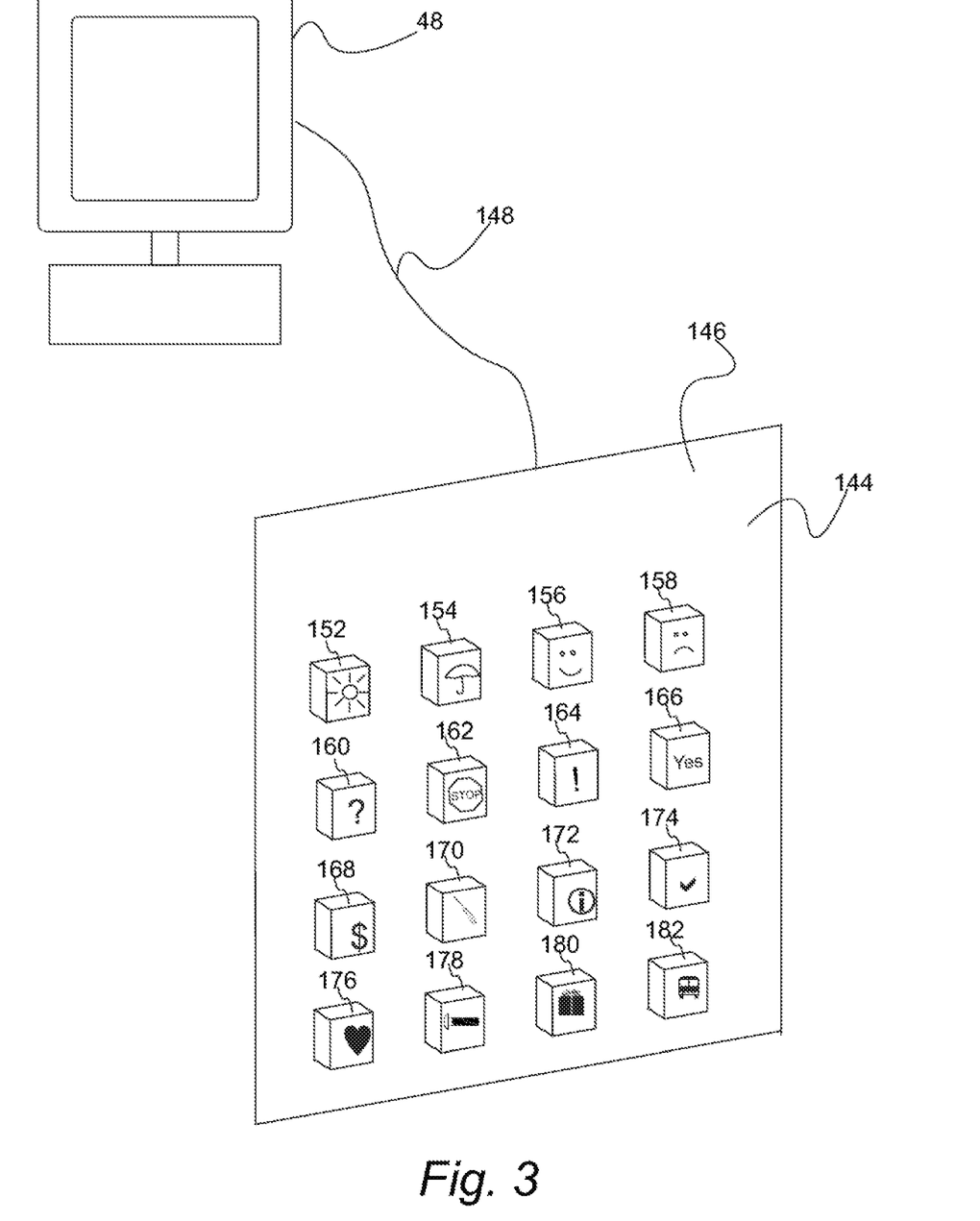
FIG. 3 is a schematic illustration of a user input tool with embossed buttons.

With reference to FIG. 3, a user input tool 144 for a computer-based system 48 is provided in various embodiments. The user input tool 144 may include a housing 146 and a plurality of buttons 152-182 secured to (i.e., attached to) the housing. Each of the plurality of buttons 152-182 is embossed with a tactually discernable non-Braille character or tactually discernable non-Braille image. Each tactually discernable non-Braille character or tactually discernable non-Braille image may be indicative of (e.g., associated with) a command that a user would want to input into a computer-based system 48, for example, the word "yes". The user input tool 144 can be operatively engaged with (i.e., in communication with) a computer system 48 by a wire 148. Alternatively, in an embodiment not pictured, the connection could be wireless. A non-limiting example of a wireless connectivity technology that could be used is Bluetooth®. The user input tool 144 may further include a transceiver to allow information to pass back and forth between the tool and the computer system 48. When one of the plurality of buttons 152-182 is pressed by a user, the indicated input command is communicated to the computer system, which may process the input command and perform an operation such as saying a word or phrase associated with the button.

Figure 4:
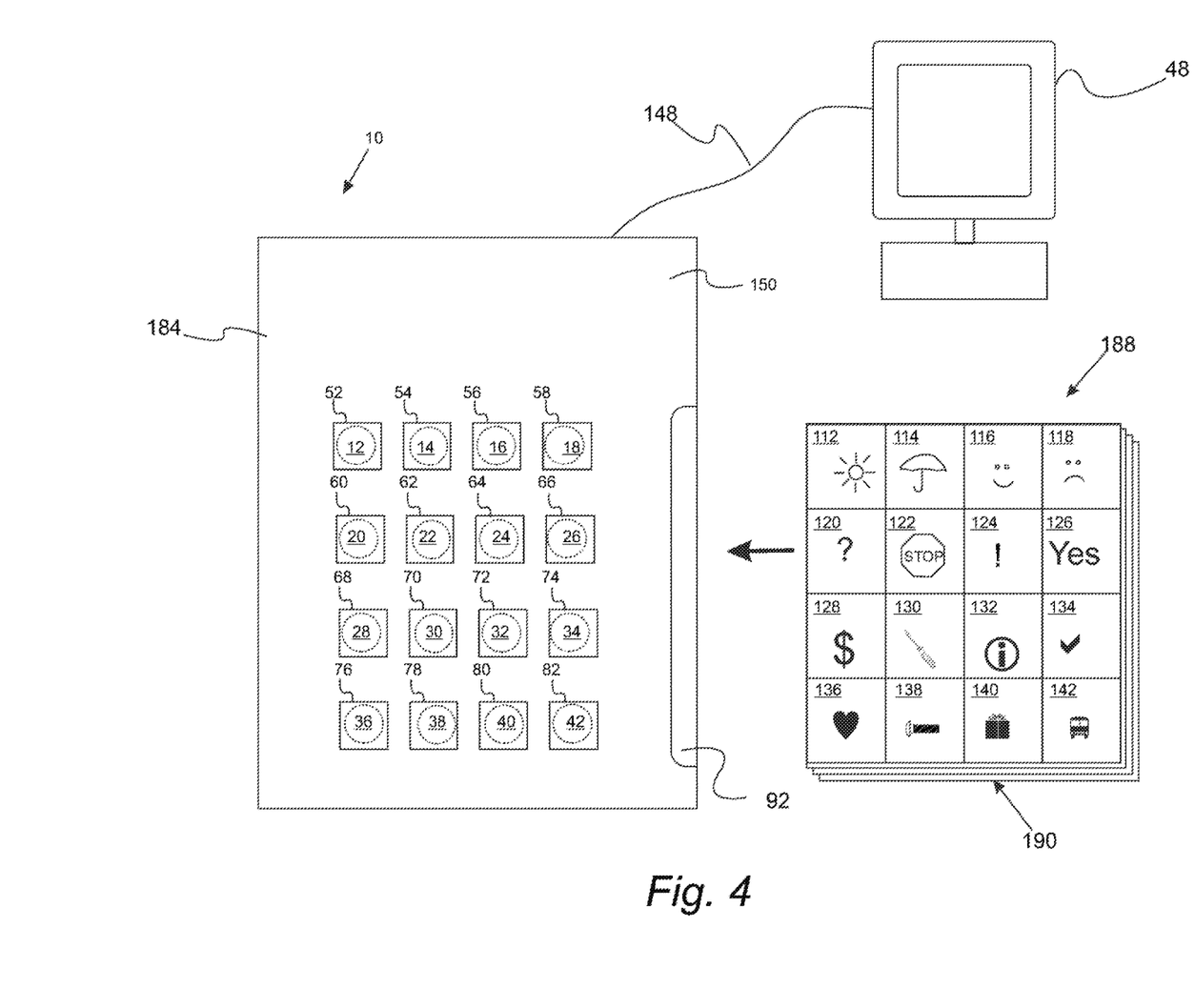
FIG. 4 is a schematic illustration of a user input tool with an overlay set of various embodiments.
Figure 5:
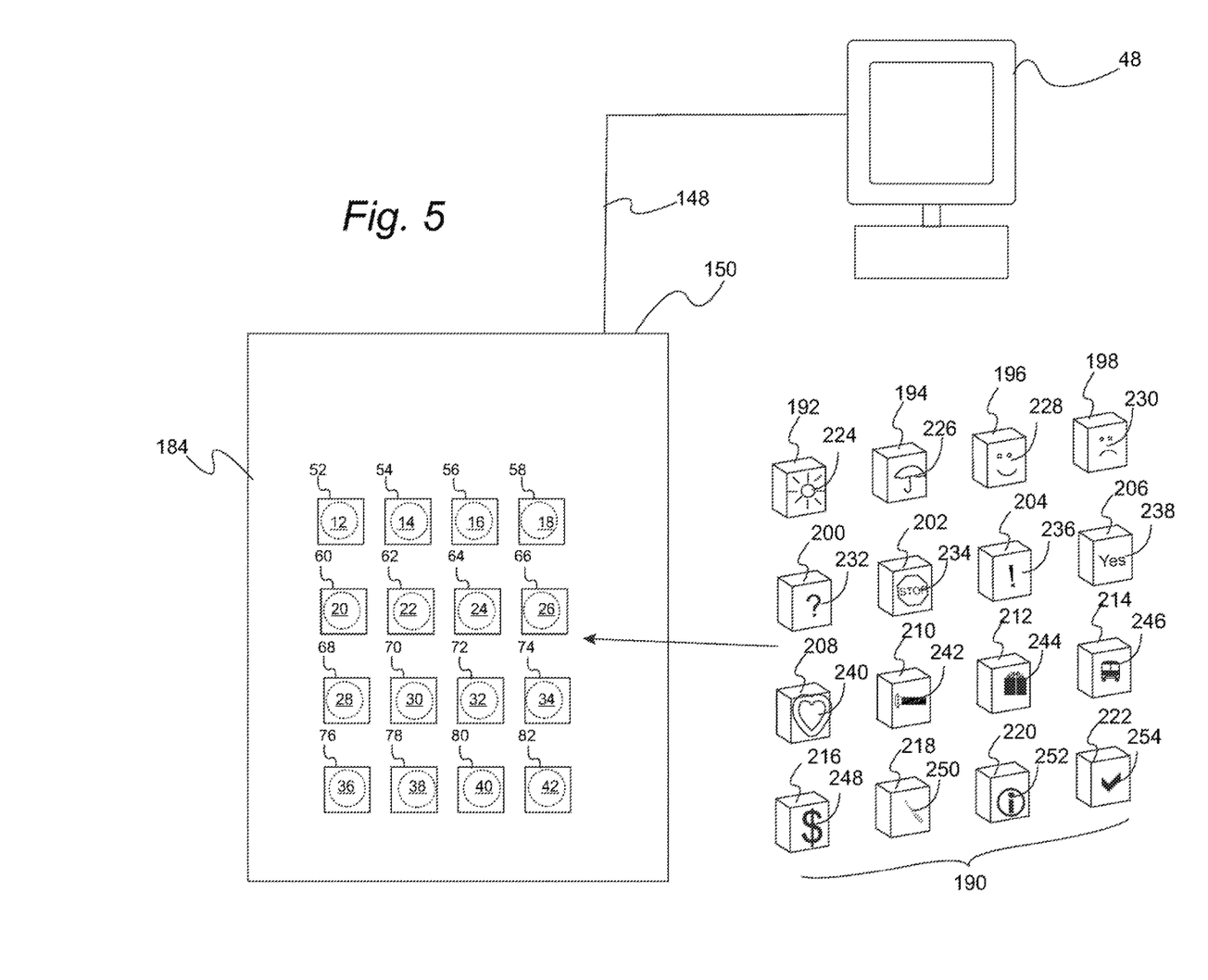
FIG. 5 is a schematic illustration of a user input tool with an overlay set of various embodiments.
Figure 6A:
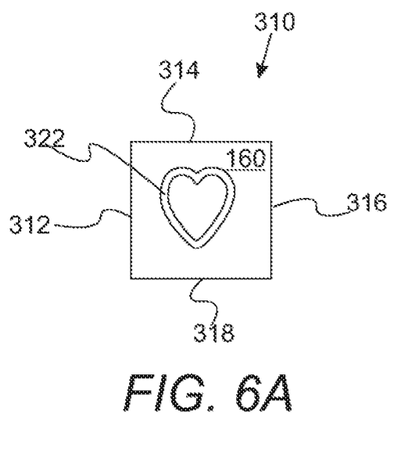
FIG. 6A is a top view of a tactile overlay key.
Figure 6B:
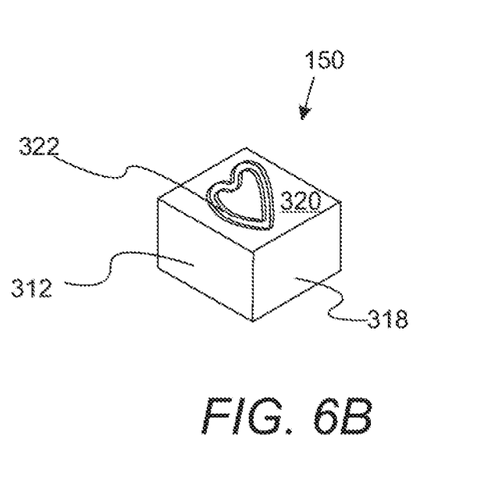
FIG. 6B is a perspective view of a tactile overlay key.
Figure 7A:
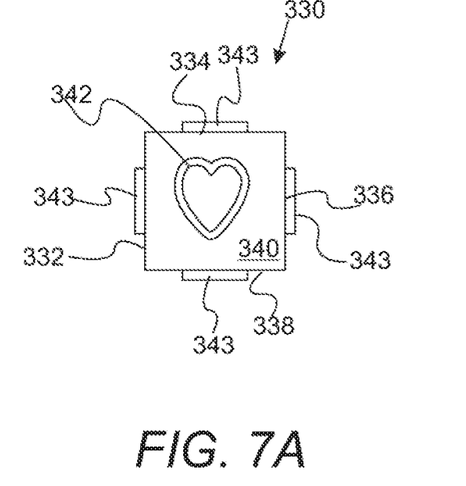
FIG. 7A is a top view of a tactile overlay key having attachment features.
Figure 7B:
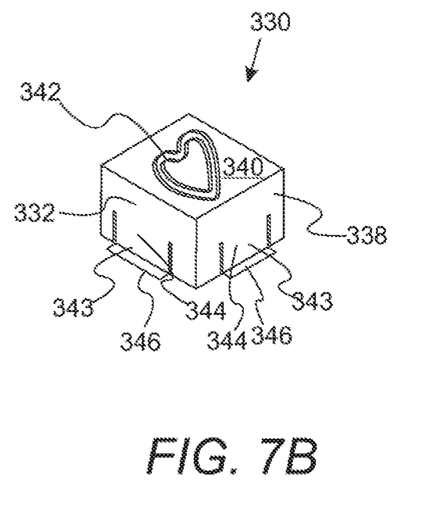
FIG. 7B is a perspective view of a tactile overlay key having attachment features.

With reference to FIGS. 4 and 5, a user input tool 150 for a computer system 48 is provided various embodiments. The user input tool 150 may include a housing 184 and a plurality of buttons 12-42. The user input tool 150 may also include a plurality of openings 52-82 defined in the housing 184, with each of the plurality of openings 52-82 providing access to one of the plurality of buttons 12-42. The user input tool 150 may further include an overlay set 190 associated with the housing 184.

As shown in FIG. 4, the overlay set 190 can alternatively include overlay sheet 188 embossed with a plurality of tactually discernable non-Braille characters or tactually discernable non-Braille images 112-142. The user input tool 150 would further include a slot 92 defined in the housing 184 to receive the sheet 188. When overlay sheet 188 is pass through slot 92, a plurality of tactually discernable non-Braille characters or tactually discernable non-Braille images 112-142 align with buttons 12-42. In a variation, overlay set 190 can include a plurality of interchangeable overlay sheets of the general design of overlay sheet 188. The user input tool 150 can be operatively engaged with (i.e., in communication with) a computer system 48 by a wire 148 or wirelessly (e.g., a Bluetooth® connection). When one of the plurality of buttons 12-42 is pressed by a user via pressing one of tactually discernable non-Braille characters or tactually discernable non-Braille images 112-142, the indicated input command is communicated to the computer system 48, which may process the input command and perform the predetermined operation such as saying a word or phrase associated with the button.

As shown in FIG. 5, the overlay set 190 can be a plurality of individual tactile overlay keys 192-222. In this variation, the plurality of tactile overlay keys 192-222 are embossed with a plurality of tactually discernable non-Braille characters or tactually discernable non-Braille images 224-254. Each of the plurality of tactile overlay keys 192-222 would be sized to fit in one of the openings 52-82. In particular, the tactile overlay keys 192-222 are operable to be removably positioned in openings 52-82. The user input tool 150 can be operatively engaged with (i.e., in communication with) a computer system 48 by a wire 148 or wirelessly (e.g., a Bluetooth® connection). When one of the plurality of buttons 12-42 is pressed by a user via pressing one of tactile overlay keys 192-222, the indicated input command is communicated to the computer system 48, which may process the input command and perform the predetermined operation such as saying a word or phrase associated with the button.

With reference to FIGS. 6A, 6B, 7A, and 7B, schematic illustrations of a tactile overlay key design that can be used for tactile overlay keys 192-222 are provided. This key design is also set forth in U.S. patent application Ser. No. 15/816,415, filed Nov. 17, 2018; the entire disclosure of which is hereby incorporated by reference. The tactile overlay keys 310 and 330 are sized to fit in openings 52-82. In particular, tactile overlay key 310 is sized to securely fit in openings 52-82. Tactile overlay key 310 includes a base section formed by side walls 312, 314, 316, 318 and a display section 320. Display section 320 is a top wall that has tactile pattern 322 embossed thereon. Characteristically, tactile pattern 322 is discernible by a user's touch. Tactile overlay key 330 includes a base section formed by side walls 332, 334, 336, 338 and a display section 340. Display section 340 is a top wall that has tactile pattern 342 embossed thereon. Tactile overlay key 330 also includes at least a pair of attachment features 343 that assist in holding tactile overlay key 330 in openings 52-82. FIGS. 5A and 5B illustrate an attachment feature that has a tab section 344 and a protruding section 346 extending from the tab section typically at a distal end of the tab section (i.e., the end most distant from top wall 340). In this refinement, the distal end can move relative to its respective sidewall thereby providing a force that acts to retain the overlay key when it is positioned in openings 52-82 with the protruding section contacting a sidewall of the opening. The tactile overlay keys can be made of any suitable material such as plastic, metal, rubber and the like.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tool for transforming a user input command into an audio output signal, the tool comprising:
   a housing;
   a user input module having a plurality of buttons, the user input module secured to the housing;
   a sound processing unit within the housing, the sound processing unit in electrical communication with the user input module;
   a speaker in electrical communication with the sound processing unit; and
   an overlay sheet enabled to be inserted into and removed from the housing, the overlay sheet having a plurality of tactually discernable non-Braille characters or tactually discernable non-Braille images embossed thereon,
   wherein each character or image is indicative of a user input command,
   wherein the plurality of tactually discernable non-Braille characters or tactually discernable non-Braille images is positionable over the plurality of buttons, and
   wherein when one of the plurality of buttons is engaged by a user, an audio output signal is communicated from the sound processing unit to the speaker.

2. The tool of claim 1, wherein the housing defines a plurality of openings that allow access to the plurality of buttons, each of the plurality of tactually discernable non-Braille characters or tactually discernable non-Braille images is positionable within an opening.

3. The tool of claim 1, further comprising a plurality of interchangeable overlay sheets, each sheet being independently positionable within the housing.

4. The tool of claim 3, further comprising arrow keys enabling a user to switch between an audio output signal for a first overlay sheet and an audio output signal for a second overlay sheet.

5. The tool of claim 1, further comprising a microphone and a memory drive in communication with the sound processing unit to store audio output signals recorded by a user.

6. The tool of claim 5, further comprising a user actuatable button enabling a memory-clearing function to erase audio output signals recorded by a user.

7. The tool of claim 1, wherein the sound processing unit further comprises electronic audio synthesizing capabilities.

8. A user input tool for a computer system, the user input tool comprising:
   a housing; and
   a plurality of buttons secured to the housing, each button having a tactually discernable non-Braille character or image embossed thereon,
   wherein each character or image is indicative of a user input command,
   wherein the user input tool can be operatively engaged with a computer system by a wireless or a wired connection,
   wherein when one of the plurality of buttons is operated by a user as an indicated input command, the indicated input command is communicated to the computer system which processes the indicated input command and performs a predetermined operation including saying a word or phrase associated with the button.

9. The user input tool of claim 8, further comprising a transceiver in electrical communication with the plurality of buttons, allowing information to pass to and from the computer system.

10. A user input tool for a computer system, the user input tool comprising:
    a housing;
    a plurality of buttons secured to the housing; and
    an overlay set associated with the housing, the overlay set having a plurality of tactually discernable non-Braille characters or tactually discernable non-Braille images embossed thereon, the plurality of tactually discernable non-Braille characters or tactually discernable non-Braille images positionable over the plurality of buttons, wherein each character or image is indicative of a user input command, wherein the user input tool can be operatively engaged with a computer system by a wireless or a wired connection, wherein when one of the plurality of buttons is operated by a user as an indicated input command, the indicated input command is communicated to the computer system which processes the indicated input command and performs a predetermined operation including saying a word or phrase associated with the button.

11. The user input tool of claim 10, wherein the housing defines a plurality of openings that allow access to the plurality of buttons, each of the plurality of tactually discernable non-Braille characters or tactually discernable non-Braille images positionable within an opening.

12. The user input tool of claim 10, wherein the overlay set comprises a plurality of individual tactile overlay keys.

13. The user input tool of claim 10, wherein the overlay set comprises a sheet.

14. The user input tool of claim 13, wherein the housing defines a slot enabled to receive the sheet.

15. The user input tool of claim 10, further comprising a plurality of interchangeable overlay sets, each overlay set being independently positionable within the housing.

* * * * *